(12) United States Patent
Driesen

(10) Patent No.: US 8,996,466 B2
(45) Date of Patent: Mar. 31, 2015

(54) EXTEND CRUD TO SUPPORT LIFECYLE MANAGEMENT AND BUSINESS CONTINUITY

(75) Inventor: Volker Driesen, Friedenstr (DE)

(73) Assignee: SAP SE, Walldorf (DE)

( * ) Notice: Subject to any disclaimer, the term of this patent is extended or adjusted under 35 U.S.C. 154(b) by 181 days.

(21) Appl. No.: 12/326,025

(22) Filed: Dec. 1, 2008

(65) Prior Publication Data
US 2010/0138440 A1 Jun. 3, 2010

(51) Int. Cl.
*G06F 7/00* (2006.01)
*G06F 17/30* (2006.01)

(52) U.S. Cl.
CPC ...... *G06F 17/3056* (2013.01); *G06F 17/30418* (2013.01); *G06F 17/303* (2013.01); *G06F 17/30377* (2013.01); *G06F 17/30362* (2013.01); *G06F 17/30368* (2013.01)
USPC ........................................................ 707/640

(58) Field of Classification Search
CPC ............................................... G06F 17/30418
USPC ........................................................ 707/640
See application file for complete search history.

(56) References Cited

U.S. PATENT DOCUMENTS

| | | | |
|---|---|---|---|
| 7,065,618 B1 | 6/2006 | Ghemawat et al. | |
| 7,334,095 B1 * | 2/2008 | Fair et al. | 711/161 |
| 2002/0059324 A1 * | 5/2002 | Kitamura et al. | 707/201 |
| 2003/0135478 A1 | 7/2003 | Marshall et al. | |
| 2005/0015353 A1 * | 1/2005 | Kumar et al. | 707/1 |
| 2005/0097289 A1 | 5/2005 | Burton et al. | |
| 2007/0226277 A1 | 9/2007 | Holenstein et al. | |

FOREIGN PATENT DOCUMENTS

| | | |
|---|---|---|
| WO | 99/08173 | 2/1999 |
| WO | 02/098048 | 12/2002 |

OTHER PUBLICATIONS

Extended European Search Report dated Sep. 16, 2009, issued by the European Patent Office in connection with counterpart European application No. 09008623.2-2201.
Wikipedia, the free encyclopedia, "Create, read, update and delete", Wikipedia Foundation, Inc., retrieved from http://en.wikipedia.org/wiki/Create,_read,_update_and_delete, pp. 1-2, accessed on Dec. 1, 2008.
Diane Lorentz et al., "Oracle Database SQL Reference—Passages", Oracle Database SQL Reference 10g Release 1, Jan. 1, 2003, retrieved from the Internet: <URL:http://infolab.usc.edu/csci585/Spring2008/Docs/SQL.pdf> [retrieved on Aug. 2, 2013].

* cited by examiner

*Primary Examiner* — Ajith Jacob
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for providing software updates. In one aspect there is provided a method. The method may include receiving a command for execution at a database. Moreover, a determination may be made as to whether the received command is one of a set of extended commands. The set of extended commands includes lock read, lock write, migrate, copy, and log changes. The received command is executed at the database. Related systems, apparatus, methods, and/or articles are also described.

18 Claims, 4 Drawing Sheets

EXTEND CRUD TO SUPPORT LIFECYLE MANAGEMENT AND BUSINESS CONTINUITY

FIELD

This disclosure relates generally to data processing and, more particularly, to databases and file servers.

BACKGROUND

Create, read, update and delete (CRUD) are functions typically associated with persistent storage, such as the storage provided to a database, a file server, an application, or a web service. For example, structured query language (SQL) supports CRUD by using the following SQL commands: an INSERT to provide the create, a SELECT to provide the read, an UPDATE to provide the update, and a DELETE to provide the delete. Although CRUD is useful, CRUD provides limited functionality, especially in connection with more complex systems.

SUMMARY

The subject matter disclosed herein provides methods and apparatus, including computer program products, for providing an extended set of CRUD functions.

In one aspect there is provided a method. The method may include receiving a command for execution at a database. Moreover, a determination may be made as to whether the received command is one of a set of extended commands. The set of extended commands includes lock read, lock write, migrate, copy, and log changes. The received command may be executed at the database (or, e.g., at a plug-in or a layer between the database and application).

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

The subject matter described herein relates to extending CRUD to include one or more of the following: lock read, lock write, migrate, copy, and log changes.

Figure 1:
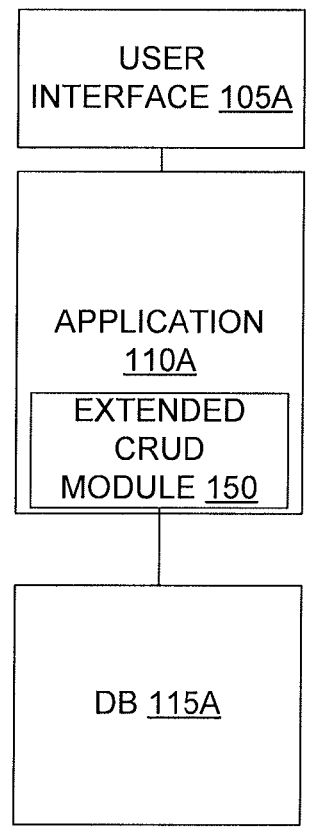
FIG. 1 illustrates a system for extending CRUD.

FIG. 1 depicts a system 100 including a user interface 105A, an application 110A, and a database 115A, all of which are coupled by a communication mechanism, such as the Internet, an intranet, and the like.

User interface 105A may be implemented as any type of interface mechanism for a user, such as a web browser, a client, a smart client, and any other presentation mechanism. Database 115A (labeled "DB") may be implemented as any type of database (or, e.g., a file server, a storage mechanism for structured data, and the like) and provides persistency (e.g., storage) to the database. The application 110A provides a program for accessing database 115A. The application 110A may be any type of program that provides such access. The application 110A may provide CRUD functionality to a user at user interface 105A. Moreover, application 110A may further include an extended CRUD module 150.

The extended CRUD module 150 may provide one or more of the following functions: lock read, lock write, migrate, copy, and log changes. Although the extended CRUD module 150 is depicted at application 11A, the extended CRUD module 150 may be located in other locations (and distributed in multiple locations) as well.

In the case of a lock read, the lock read function is used to lock against reads to persistent storage, such as database 115A. The term function may also refer to a command. Rather than allowing read access to an entry of database 115A, the extended CRUD function of lock read prevents a read to the entry in database 115A and results in an error message (e.g., an exception message). As such, the lock read ensures that the entry is not read by an application, such as application 110A, or a user at user interface 105A. The lock read function may be used, for example, in a variety of areas. For example, the lock read may be used during software maintenance management, as further described below, to ensure that data, such as an entry in database 115A, is not accessed when another high-level process cannot ensure a consistent state of the data (e.g., an object associated with the data at database 115A) with respect to other data (e.g., objects) stored in system 100 and, in particular, database 115A.

The lock read may also be used with a so-called "lazy migration." During a lazy migration, the data associated with database 115A or application 110A is migrated online (i.e., during runtime) to a new format at, for example, another system. This migration is done while the database 115A and/or application 110A are using the data being migrated to the other system. For data categories which are written to a database with a high frequency but only read with low frequency, the lock read (which may be configured at extended CRUD module 150) may be used for a given time period to enable the lazy migration. A typical application for lock read is updating data (e.g., stored in a database) when the data is outdated and updating is still possible but reading would otherwise still be allowed. In this example, lock read disables reading during the update of the data.

Another extended CRUD function is the lock write. The lock write function locks all attempts to write an entry to a database. The lock write also results in an error message (e.g., an exception message) during the lock write rather than allowing a write to the entry in the database. As such, no new entries are written by application 110A or by user interface 105A to the database 115A. The lock write may be used, for example, to ensure that a new configuration is complete and consistent before new entries are written to database 115A. The lock write may also be used to create a "read-only" mode of an application, which allows backups or other persistency related activities. A typical application for the lock write may be when data is available for reading but not for writing because data is being used by another application.

Another extended CRUD function is the migrate function. The migrate function transforms an older structure of an object to a newer structure of the object. Migrate may thus be used to adjust the persistency (e.g., the structure of data objects, such as tables, in database 115A) to accommodate, for example, a new software version or data structure used at application 110A or database 115A. If the migrate function is offered at an object level, the migrate function may be used during the update deployment of the new version and during transportation of an object from one system to another system running, for example, a different software version.

Migration may be implemented in a variety of ways. For example, structural information about the data being migrated is added to a container including log information. The migration would result in, for example, a data transfer which would also include structural interpretation rules for the data being transferred. In some implementations, the migration function performed by the extended CRUD module may further include evaluating structural rules, interpreting the data being transferred during the migrate, and mapping the data set elements to the new structure. In this example, a repository may be used to store structure information. When this is the case, the migration may refer to a version number (e.g., corresponding to the structural information stored in the repository) rather than include in the migration the actual structure information. Migration may also be provided by using new classes, which implement the extended CRUD methods for a data object providing methods for input of each of the formats being migrated. In this case, the version of the old format is derived from the knowledge of the software version. Migration may also be provided by using a delta-module, which may be implemented as part of the migration function of the extended CRUD module. When a migrate is executed, the delta (or change) module transforms the data set to the structure of the new software version. Thus, a typical application of migration is when data is stored (e.g., in a database 115A) in a first format, and the data is moved to another location (e.g., another database 215A) and then reformatted to a second format used at database 215A. This example illustrates that a simple copy (which would not make any format adjustments during the move) would not be sufficient.

Another extended CRUD function is the copy function. The copy function is used to create an exact copy of data, such as objects, in another system. The copy may have the same data as the original object including, for example, a creation time stamp (e.g., "created by") and references to the objects on a mirror system (also referred to as a shadow system). During the copy to the other system, no additional actions (e.g., checks, triggering, follow-up actions, and the like) are allowed. Moreover, the copy can be used to transfer data from one system to another on a persistency level of "one-to-one." For example, if a date entered into a database is for an order that is in the future, the order would be created and copied only with a status of new (and not with a status of completed), and entries with status completed would subsequently be copied. The copy provides a data set including attributes without additional checks or modifying data like the attributes.

An operation to the persistency of a single type of object (e.g. a transformation to a new structure, an extension requiring additional application specific steps, and the like) may be executed using the following process to ensure all processes using the persistency are secured to process only consistent data and to write data only at phases where a data write is possible to maintain data consistency. The process (which is depicted at 350 at FIG. 3) includes using the lock write function to disable changes to the objects and then using the migrate function to transform the data to the new structure. Next, the lock write is released.

The operation can be executed for a single type of object during productive use of the applications using the objects. For the object or set of objects, the log changes function is enabled. The objects are then copied using the copy function. The copied object (e.g., data at database 115A) is transferred to the new structure using the migrate function. Then, the logged changes are applied to the copied objects using the migrate function. A lock write function and a lock read function are set, the original version of the object is deleted (e.g., at database 115A), the copied objects are switched to be the objects used for production (e.g., at database 215A). Afterwards the "lock write" and "lock read" can be released. Using this approach, object availability is ensured during the migrate process, and the unavailability is reduced to a switch. For large data volume, the migrate can take up to several hours, the switch described herein is usually on the order of seconds.

Compared to a traditional create provided by CRUD, the copy does not execute additional methods, such as checks, triggering follow up actions and adding generated data. Unlike a copy command, the CRUD creates command stores (together with the primarily entered data) and secondary metadata (e.g., for a telephone number, which is entered as a primary database entry, the secondary data includes a name of the user who entered the data and a date at which the data was entered or changed). In contrast to the create, a copy command does not create this secondary metadata. But the copy command may be used to copy the secondary metadata, which may be created by the CRUD create command. A typical application of the copy function is provide a low overhead copy of data from one location (e.g., a database) to another location (e.g., another database).

A copy function and a migrate function may be used during a software upgrade to build up the shadow database 215A or handle the replication. The copy function may be instead of the migrate function when the data structure is not changed. A migrate function is generally used to transform existing entries into a structure used by the new software (e.g., no secondary data is changed). A create function is generally used to create new entries to persist data entered by the user. For example, the user enters a new customer address into the system 100. The system 100 uses the create function to create a new object, which is persisted to the database 115A. The system 100 can then add the name of the user and the current date to the customer address upon storage. Upon the upgrade, the data is read from the database 115A and the method migrate function is used to transform the data to the new structure at the shadow system 200 (e.g., in the case of a data migration, in the old system 100, the data was stored in a relational database table, where for each entity in the object, there is a field in the database table, whereas in the new system 200, the data is formatted using a XML string and is stored in a database table which has a character field which can take the XML string). In this example, the "copy" command can be used to copy the data set "customer address" including the date and the name of the user who entered the data to database 215A.

Another extended CRUD function is the log changes function. The log changes function logs changes of objects (e.g., data stored at database 115A) for later processing. The actual information of the log change is written to a primary persistency, such as database 115A, but the changes are made accessible for later use by application 110A and user interface 105A, as well as other components. The log changes function may also store all changes done to all instances of a certain object type stored at database 115A. For example, log changes may log one or more of the following: any change operations (e.g., create, read, update, delete, as well as the extended CRUD functions described herein) to the entries of the database; a timestamp indicative of when the change was made; a key describing the object (e.g., entries of a database) being changed; and the actual content representing the content of the change (e.g., the before content and/or the after content of the entry being changed in a database). The logging performed by the log changes function can be initiated to log all activity over a certain period of time or over a certain object type (or change type). Moreover, extended CRUD module 150 may provide different levels of log changes service. These different levels of log changes include one or more of the following: log at least once; log exactly once; log changes exactly once in order (of the change time); and a compressed change log (e.g., storing only the last state of the change, if one object is changed several times during the log period).

A typical application of the log changes function is as a low-level database functionality, such as a plug-in for a database method to store deltas for database archiving (e.g., a log writer). The log changes may be implemented using database triggers or stored procedures. The log changes may be implemented using a common software layer in the application (e.g., at a database interface). The log changes may be implemented using software application modules, which create a high-level recording (e.g., individually designed for each kind of persistency).

Figure 2:
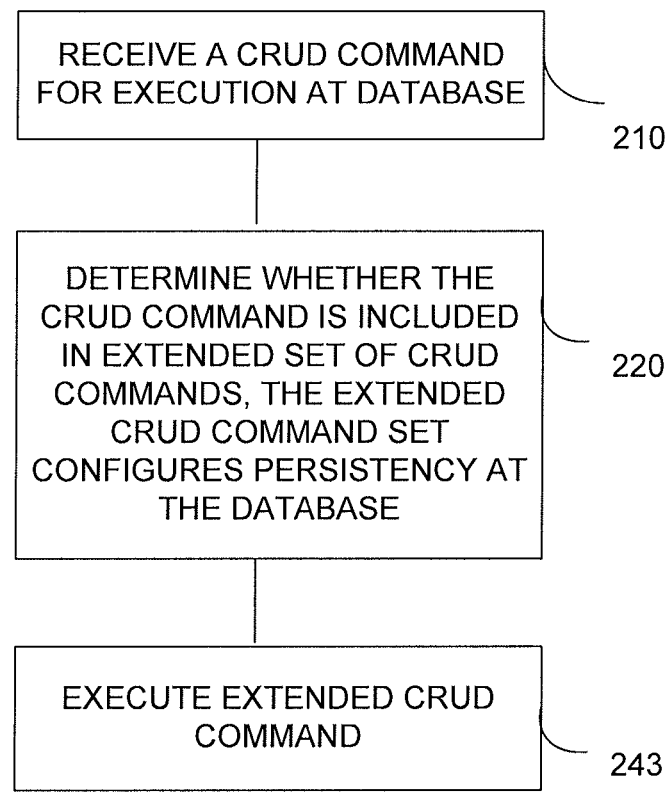
FIG. 2 illustrates a process for extending CRUD.

FIG. 2 depicts a process 200 for providing the extended CRUD functions described herein. The description of FIG. 2 also refers to FIG. 1.

At 210, a CRUD command is received for execution. For example, application 115A may receive from user interface 105A a CRUD command for execution at database 115A.

At 220, a determination is made whether the received CRUD command is included in the extended set of CRUD commands. For example, if the CRUD command includes one of the following extended CRUD commands: lock read, lock write, migrate, copy, and log changes, which extended command is provided to extended CRUD module 150. The extended CRUD commands are thus used to configure the persistency related mechanisms at application 110A and/or database 115A. As described above, a lock read locks reads to entries in database 115A; a lock write locks writes to entries in database 115A; a migrate transforms an older structure of an object to a newer structure of the object; a copy create an exact copy of data, such as objects, in another system; a log changes logs changes of objects (e.g., data stored at database 115A) for later processing.

At 230, when a command corresponds to an extended CRUD command, that extended CRUD command is executed. For example, extended CRUD module 150 determines that an extended CRUD function (e.g., lock read, lock write, migrate, copy, and log changes) has been received, the extended CRUD module 150 implements (e.g., executes) that function at a persistency, such as database 115A.

The following description provides additional embodiments related to use cases for the extended CRUD functionality described above. In some implementations, the use of extended CRUD increases availability—thus decreasing downtime. Moreover, the use of the extended CRUD functionality may be used in connection with software life cycle management, data replication, and service relocations, all of which are described further below.

Figure 3:
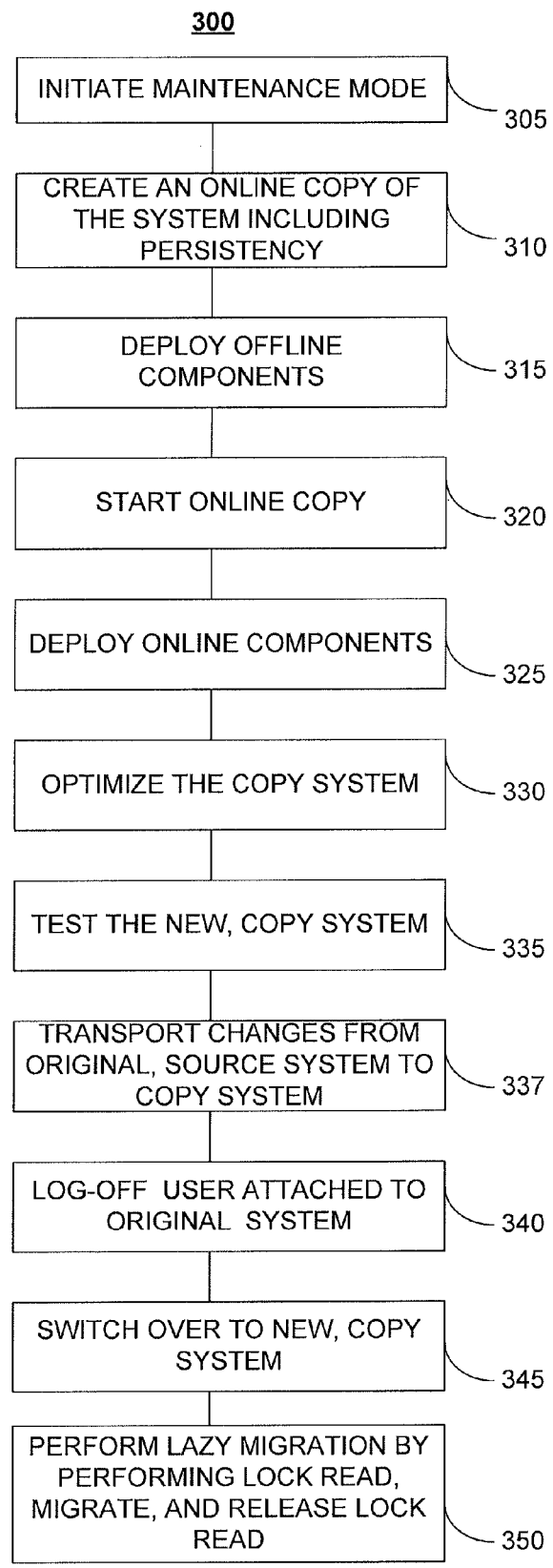
FIG. 3 depicts a process in which the extended CRUD functions may be used.

FIG. 3 depicts a process 300 for using extended CRUD functions as part of a zero downtime maintenance activity. The phrase "zero downtime" refers to performing a maintenance activity, such as a software upgrade, with little or no downtime. In some implementations, the runtime environment of a production system is migrated to a shadow system. The migrated runtime environment, such as applications and data, are adjusted for operation at the shadow system. During the maintenance activity, the run time environment is then deployed. In addition, the persistency, such as the database 115A, may be adjusted to a format that can be accessed (e.g., read) by the newly upgraded version of the runtime environment. In some implementations, extended CRUD modules 150 and 250 control process 300.

To minimize downtime (e.g., a zero downtime maintenance activity), the described CRUD extensions may be used to establish process 300.

Figure 4:
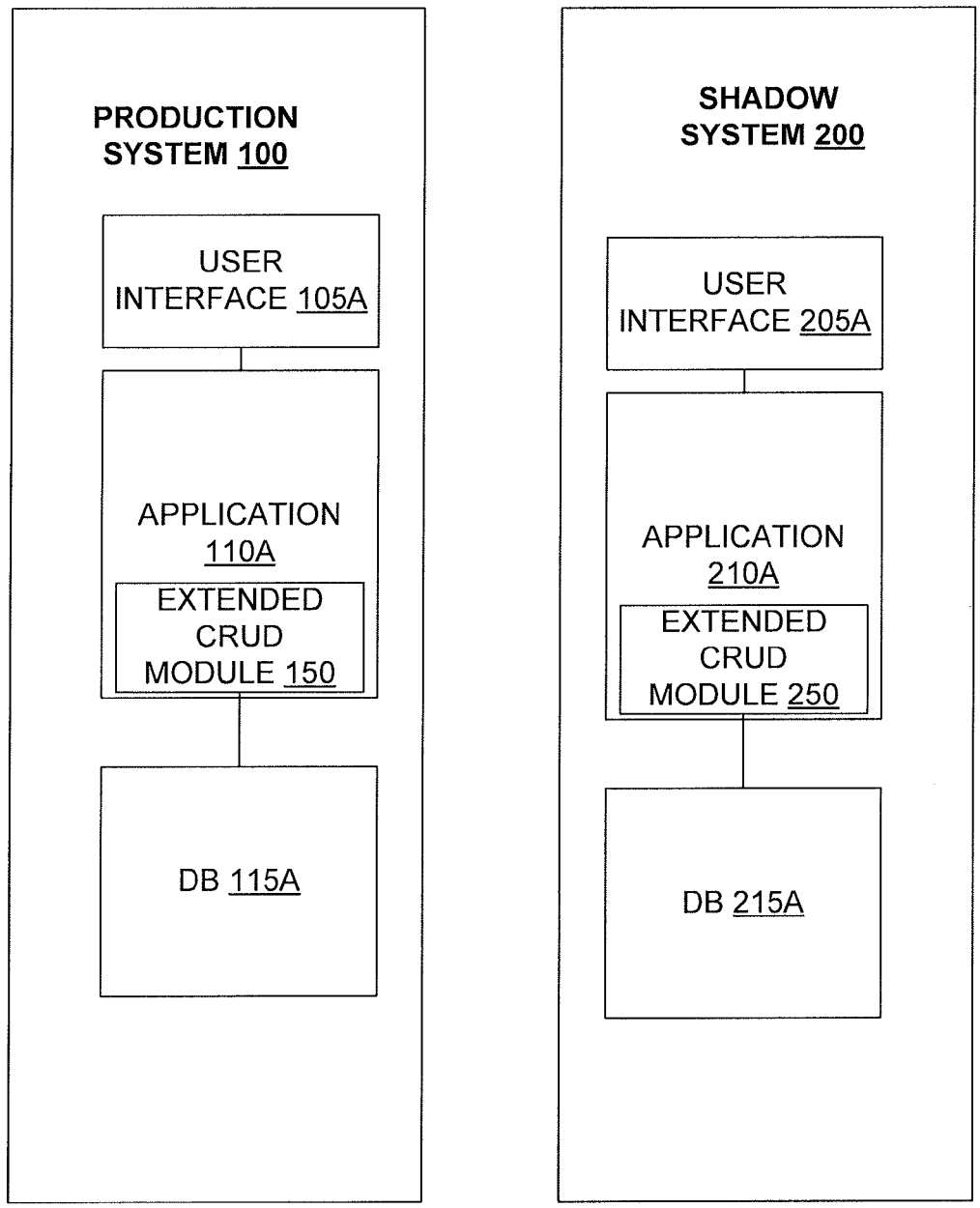
FIG. 4 depicts a system in which the extended CRUD functions may be used.

At 305, the system, which is online and in use as the production system, is placed in a maintenance mode. FIG. 4 depicts the system 400 including a production system 100 (which is system 100 of FIG. 1) and a shadow system 200, which is being upgraded with, for example, a new software program (or, e.g., new data) as part of the maintenance activity. To implement a maintenance mode, components of application 110A and/or database 115A may be placed into a read-only. For example, a lock write command may be used to prevent writes to application 110A and/or database 115A, thus limiting access to read only. These read-only mode components are not required to have write access during the period of maintenance activities. If write access is required during the maintenance activity, the writes are allowed and the log changes function is used to log any changes. For example, when the production system 100 is copied (and/or migrated) to the shadow system 200, the log changes function (or command) may be used to log changes (e.g., at production system 100) that occur to the production system 100 during this copy (and/or migrate) and upgrade of shadow system 200, so that any changes that occur during this transition are made to the shadow system 200.

At 310, a copy of the production system 100 is created including persistency, such as database 115A. For example, production system 100 including its applications, such as applications 110A, user interface 105A, and database 115A, are copied to, for example, shadow system 200 depicted at FIG. 4. Moreover, the data (including the file system) persisted in database 115A is also copied (and/or migrated) to database 215A.

At 315, offline components are deployed. For example, any applications or data at system 100, which are not being used as part of the runtime, are migrated (e.g., using the migrate function) to the shadow system 200. These offline components may include hardware, operating system, and a database.

At 320, the shadow system 200, including the copied (and/or migrated) components, is started in a so-called "restricted mode." The restricted mode may include one or more of the following features: no applications on the shadow system 200 are running and no access to the shadow system 200 by end users (or remote systems) is allowed. For example, an administrator shall have access to production system 100 and the transportation logic of the original, production system 100.

At 325, the online components are deployed to shadow system 200. Specifically, the online components of the maintenance activity are deployed (e.g., implemented) at the shadow system 200. For example, if the maintenance activity includes updating an operating system and installing a new software release (e.g., another or a new version of application 210A), these online components (e.g., the operating system and new software release) are deployed to the shadow system 200.

At 330, the copy system is optimized for the new configuration at the shadow system 200 (e.g., caches may be copied into the shadow system 200). Optimization may be used to prepare the system for productive use. For example, data may be copied into caches to ensure that the new, shadow system has full performance after switchover of the users to the shadow system. In the case of a just-in-time-compiler (e.g., where sources are delivered and the runtime object is created at the customer system on-demand), the most frequently used runtime objects may be copied to ensure that the shadow system has full performance after switch-over of the users to the shadow system. Moreover, system parameters may be adjusted (e.g., parameters which require a restart of the system and which would thus cause downtime if executed after the switchover).

At 335, the copied components at the shadow system 200 are tested. These tests may be, for example, read-only tests. For example, before users "go live" with their new, shadow system (e.g., using the new system for production or business operation), the user may ensure that the shadow system behaves as defined. The tests may be performed on the shadow system (or other separate systems and hardware) before the final upgrade of the production system. On the production system, "spot check" tests are executed to verify, that the new, shadow system behaves as during the previous tests. The shadow system can be used for these activities, as long as no data is produced in the database that would conflict with data created in the production system.

At 337, all changes done on the original system 100 after the start of the maintenance mode (e.g., which were logged as a result of a log changes command) are read, and the changes are transported (e.g., sent) to the shadow system 200. These changes are then executed (which is referred to as a re-play of the changes) at the shadow system 200. Moreover, during this transport of the changes for replay, any changes taking place at the original production system 100 are still recorded. As such, the process of transporting and replaying changes to shadow system 200 is repeated until all, or substantially all, of the changes have been posted to shadow system 200. This repetition may cease (i.e., stop repeating) by repeatedly monitoring the volume in the log container. For example, once the number of changes goes below a predefined threshold, the repletion may be stopped.

At 340, users attached to database 115A are uncoupled (e.g., logged-off) from production system 100. For example, a so-called "friendly log-off" of the users at production system 100 can be performed by logging off users from original production system 100, locking production system 100 to disable new logins, and preparing the production system 100 for closure (or shutdown) by, for example, emptying queues, and the like. The friendly log-off process logs off users from the old, production system in a manner that the users do not loose current active transactions. In some implementations, a session switch over is used rather than a log off. The session switch over is implemented by transferring to the new, shadow system all data (including the entered data set) held in the system for a user and migrated to the session format of the new software version.

At 345, production use is switched from the production system 100 to shadow system 200. At this point, users and other systems are allowed to attach and access database 215A. Moreover, production system 100 may be disabled (e.g., disconnected to prevent further use). The database of the old, production system 100 will be kept for some time to have a "fast fallback" if the new system does not operate as expected. Afterwards it may have to be archived for compliance reasons.

In some implementations, at 350, the system 100 may perform a so-called lazy migration by using the lock write function to disable changes to the objects and then use the migrate function to transform the data to the new structure. Next, the lock write is released.

As such, process 300 may be used to upgrade software at production system 100 using a shadow system to first implement the software upgrade before implementation as a live, productive part of system 400. For example, data (including data persisted at database 115A, applications, and the like at production system 100) may be locked to prevent writing using the lock write functions (optionally if required, data can also be locked to prevent reading using the lock read function). This locking prevents unwanted writes (and optionally unwanted reads) during the upgrade process 300 from production system 100 to shadow system 200. Moreover, when the data includes, for example, a new format for data persisted at database 215A, a migrate may be used to move and reformat the data to the new format required by the upgraded software being used at shadow system 200. When data does not require reformatting, a copy command may be used to move the data from database 115A to database 215A. During the copy or migration, any changes made to the data at database 115A may be logged using the log changes function. As such, these changes can later be made to (i.e., replayed) the data at database 215A, so that the data at database 115A and database 215A are consistent.

In some implementations, the system 100 is set to maintenance mode (e.g., data which is not required to be changeable during productive use of the system 100 is set to read only using the "lock write" function, while data which has to be changeable is tracked using the "log changes" function to record all changes). The system 100 is copied to create shadow system 200. For the copy, all required entities for the system 100 are copied, this can include kernel programs, configuration of the kernel, business application software, configuration of the business application software and business data. This copy can be executed using the "copy" command, which creates a one-to-one copy without changes of the data sets. To the shadow system 200, the new software version is deployed (while the system 100 can be used in parallel to shadow system 200). The "log change" and "lock write" (which had been set to establish the maintenance mode and which might have been copied during the creation of the shadow system) are released in the shadow system 200. The deployment of the new software can include updating configuration and changing the persistency format of the business data in persistency 215A. The change in the persistency format of the business data on the shadow system can be established using the "migrate" function. Once the deployment of the new software including the adjustment of configuration and the migration of business data is complete, the logged changes to the productive system 100 can be transferred to (e.g., made to) the shadow system 200. For the transferred data, if the persistency structure does not have to change, the copy function may instead of the migrate function, which changes the persistency structure. During the process of transferring data from 100 to 200 (while the log changes process is recording changes at database 115A), any newly logged changes are transferred and new changes made to the persistency at database 215A. This process may be repeated until the logged changes are below a certain threshold, at which point the system 100 may be stopped and users at system 100 may be logged out. The remaining logged changes may be transferred to the shadow system 200.

Next, users are allowed to log on to shadow system 200. On system 200, certain data is set to "read lock," which is not to be read during the starting period of system 200. The "read lock" is used to enable the "lazy migration." The target persistency structure is created, but the data is read from the old persistency 115A of system 100. A process is started which reads data from the persistency 115A and copies (and/or migrates) the data to write that data to the new persistency 215A. For data where a "lock read" is not possible, a process can be used, where new data is written directly to the new persistency 215A. If data is read, the data is looked up in the new persistency 215A, if no entry is found it is read from the old persistency 115A, and transferred to the new structure of database 215A using the migrate function if needed. It is then stored to the new persistency. If a data set is to be deleted, the data set is deleted in the old database 115A and the new persistency 215A (alternatively, an indication is made in the new persistency that the data set has been deleted and should not be looked up in the "old" persistency). Once the migration is complete, the lock read can be released. Once data is migrated and the system 200 does not have locks, system 200 can be used with full functionality. Using this approach data migration is executed as a preparation step before switching to the new software version. The system 100 can be used during the complete process 300 with only a relatively small impact to downtime.

The extended CRUD function can also be used for online data migration. For example, data migration might be required, when the structure of data is changed, the persistency has to be changed, and/or underlying software, like a database, is changed. The online migration may require the extended CRUD commands of copy, migrate, and log changes. In the case of an incremental migration, the new persistency, such as database 215A, is prepared incrementally and, once most of the data is migrated, the application is switched to the new persistency.

The extended CRUD functionality may also be used to perform a so-called lazy migration. For example, the target persistency is created (e.g., database 215A), and the application is switched directly to the new, target persistency. But reading of the old persistency (e.g., database 115A) can still be performed. For example, the following process may be used to create a new persistency: plug in a read-module and run a batch job that migrates data in parallel (e.g., while in use at the production system) to the target persistency. Regarding the read-module, it can look in the new, target persistency for an entry, and, if there, read the entry from the new persistency. If the entry is not there, the read-module may read from the old persistency, migrate, and write the read entry to the new persistency. If an entry is deleted, it is deleted in the new persistency 215A and in the old persistency 115A (another option is to delete it only in 215A and store in 215A that this entry is deleted and is not to be read any longer from persistency 115A). For an application that does not require read access to data for a given time, the above-described lazy migration might be simplified to create new persistency, use the read lock function to lock an entry (e.g., data in the database), and run a batch job that migrates data in parallel to the persistency (e.g., while online, i.e., in use). Once objects are migrated, the read lock is released.

The extended CRUD function of lock read may also be used for a so-called "mass read," which would result in a mass migrate as described above with respect to the lazy migration. The mass read may include creating a new persistency; locking mass read functions at the old persistency (e.g., database 115A); and running a batch job that migrates data in parallel to the use of the new persistency (e.g., database 215A). Regarding the read-module, it can look in the new persistency for an entry, and, if there, read the entry from the new persistency. If the entry is not there, the read-module may read from the old persistency, migrate, and write to the read entry to the new persistency. Once all objects are migrated, the mass read lock is released to allow reads.

During the deployment of configuration changes, especially business configuration changes, the system 400 might be in an inconsistent state. Usually, during this deployment process, the system is in a "business downtime." For a zero downtime deployment of configuration changes, the described extensions could be used to establish a deployment where the application is in "read-only" mode. For example, the applications that receive a new configuration (or upgrade) are placed into read-only states. This may require an extended CRUD function of read lock. The new configuration is deployed, and then the new configuration is put into a normal mode to allow reading the new configuration.

In the context of system relocation and/or data replication, a system (or its data) is moved to another runtime environment, e.g. another host. This process can be executed with less downtime, if the procedure is extended by placing the system into a maintenance mode; creating an online copy of the system, including persistency; moving the copy of the system to the new location; reading all changes done on the original system after the start of the maintenance mode and then transporting these changes to the copy system and re-play the log changes there; logging-off (e.g., a so-called friendly log-off as described above) of the users from original system; and switching over to the new system (i.e., switching to the copy).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A non-transitory computer-readable storage medium containing instructions to configure a processor to perform a method, the method comprising:
   receiving a command for execution at a database;
   determining whether the received command is one of a set of extended commands, the set of extended commands comprises a lock read, a lock write, a migrate, a copy, and a log changes, the set of extended commands configure a persistency at the database based on a structure and format of a persistency at a shadow database;
   the configuration of the persistency includes
      executing the lock write command to prevent a write to at least one of the database and the shadow database;
      initiating, based on the executed lock write command, the migrate command, the migrate function including a delta module to transform data stored in a first format of an older structure of an object stored to a data in a second format of a newer structure of the object for storage, wherein the object is stored at least one of the database and the shadow database;
      enabling the log changes command to record changes to at least one of the database and the shadow database resulting from the at least one of the following the executing of the lock write command and the initiating of the migrate command;
      applying, using the migrate command, changes recorded by the log changes command to the database; and
      releasing the lock write command;
   and
   executing the received command at the database, when the received command is one of the set of extended commands, wherein when the write lock is attempted, an error message is sent.

2. The computer-readable storage medium according to claim 1, wherein the processor is further configured to perform
   implementing the extended set of commands as part of a maintenance process, wherein
      the lock read configured to lock data to disable reads at a first system,
      the lock write configured to lock data to disable writes at the first system,
      the migrate configured to migrate a portion of data from the first system to a second system, the migrated data being reformatted in accordance with a format of the second system,
      the copy configured to copy another portion of data from the first system to the second system, and
      the log changes configured to log changes made to data at the first system to enable the changes to be applied to the second system.

3. The computer-readable medium of claim 1, wherein the lock read prevents a read to an entry of the database and, when the read is attempted, an error message is sent.

4. The computer-readable medium of claim 1 further comprising:
   executing, during a migration from a first system to a second system, the lock read for an entry in the database.

5. The computer-readable medium of claim 1, wherein the copy creates an exact copy of data, wherein during the copy, checks are not executed.

6. The computer-readable medium of claim 1, wherein the migrate transforms an older structure of an object in the database to a newer structure.

7. The computer-readable medium of claim 1, wherein the log changes record a change operation to an entry of the database, the change comprising at least one of adding a new entry, changing an existing entry, and deleting an entry.

8. The computer-readable medium of claim 7, wherein the log changes record the change operation including a timestamp indicative of when the change operation was made, a key describing the entry being changed, and a content representative of the change operation.

9. A method comprising:
   receiving a command for execution at a database;
   determining whether the received command is one of a set of extended commands, the set of extended commands comprises a lock read, a lock write, a migrate, a copy, and a log changes, the set of extended commands configure a persistency at the database based on a structure and format of a persistency at a shadow database;
   the configuration of the persistency includes
      executing the lock write command to prevent a write to at least one of the database and the shadow database;
      initiating, based on the executed lock write command, the migrate command, the migrate function including a delta module to transform data stored in a first format of an older structure of an object stored to a data in a second format of a newer structure of the object for storage, wherein the object is stored at least one of the database and the shadow database;
      enabling the log changes command to record changes to at least one of the database and the shadow database resulting from the at least one of the following the executing of the lock write command and the initiating of the migrate command;
      applying, using the migrate command, changes recorded by the log changes command to the database; and
      releasing the lock write command;
   and
   executing the received command at the database, when the received command is one of the set of extended commands, wherein when the write lock is attempted, an error message is sent.

10. The method of claim 9 further comprising:
    implementing the extended set of commands as part of a maintenance process, the extended set of commands used to lock data to disable reads at a production system, to lock data to disable writes at the production system, to migrate a portion of data from the production system to a shadow system, the migrated data reformatted in accordance with a format of the shadow system, to copy another portion of data from the production system to the shadow system, log changes made to data at the production system to enable the changes to be applied to the shadow system.

11. The method of claim 9, wherein the lock read prevents a read to an entry of the database and, when the read is attempted, an error message is sent.

12. The method of claim 9, further comprising:
    executing, during a data migration from a first system to a second system, the lock read for an entry in the database.

13. The method of claim 9, wherein the copy creates an exact copy of data, wherein during the copy, checks are not executed.

14. The method of claim 9, wherein the migrate transforms an older structure of an object in the database to a newer structure.

15. The method of claim 9, wherein the log changes record a change operation to an entry of the database.

16. The method of claim 15, wherein the log changes record the change operation including a timestamp indicative of when the change operation was made, a key describing the entry being changed, and a content representative of the change operation.

17. A system comprising:
a processor; and
a memory, wherein the processor and the memory are configured to perform a method comprising:
receiving a command for execution at a database;
determining whether the received command is one of a set of extended commands, the set of extended commands comprises a lock read, a lock write, a migrate, a copy, and a log changes, the set of extended commands configure a persistency at the database based on a structure and format of a persistency at a shadow database;
the configuration of the persistency includes
executing the lock write command to prevent a write to at least one of the database and the shadow database;
initiating, based on the executed lock write command, the migrate command, the migrate function including a delta module to transform data stored in a first format of an older structure of an object stored to a data in a second format of a newer structure of the object for storage, wherein the object is stored at least one of the database and the shadow database;
enabling the log changes command to record changes to at least one of the database and the shadow database resulting from the at least one of the following the executing of the lock write command and the initiating of the migrate command;
applying, using the migrate command, changes recorded by the log changes command to the database; and
releasing the lock write command;
and
executing the received command at the database, when the received command is one of the set of extended commands, wherein when the write lock is attempted, an error message is sent.

18. The system of claim 17, wherein the processor and the memory are configured to perform
implementing the extended set of commands as part of a maintenance process, the extended set of commands used to lock data to disable reads at a production system, to lock data to disable writes at the production system, to migrate a portion of data from the production system to a shadow system, the migrated data reformatted in accordance with a format of the shadow system, to copy another portion of data from the production system to the shadow system, log changes made to data at the production system to enable the changes to be applied to the shadow system.

* * * * *